United States Patent [19]

Thiery et al.

[11] 4,013,100

[45] * Mar. 22, 1977

[54] FLEXIBLE ELONGATED MEMBER COMPRISING A REINFORCING ARMOURING

[75] Inventors: Jean Thiery, Le Pecq; Michel Chatard, Chatou; Gerard Bonavent, Rueil-Malmaison; Michel Huvey, Bougival, all of France

[73] Assignee: Institut Francais du Petrole, des Carburants et Lubrifiants et Entreprise de Recherches et d'Activities Petrolieres Elf, France

[ * ] Notice: The portion of the term of this patent subsequent to Jan. 7, 1992, has been disclaimed.

[22] Filed: Nov. 27, 1973

[21] Appl. No.: 419,350

[30] Foreign Application Priority Data

Dec. 8, 1972 France .............................. 72.43796
May 16, 1973 France .............................. 73.17841

[52] U.S. Cl. ............................... 138/129; 138/130; 138/132; 138/134; 138/172; 138/174
[51] Int. Cl.² ................... F16L 11/10; F16L 11/12; F16L 11/16
[58] Field of Search ..... 138/135, 122, 121, DIG. 5, 138/178, 174, DIG. 2, DIG. 7, 120, 117, DIG. 8, 129, 130, 132, 133, 172; 174/102 D

[56] References Cited

UNITED STATES PATENTS

| | | | |
|---|---|---|---|
| 1,055,263 | 3/1913 | Fischer | 138/131 |
| 1,055,263 | 3/1913 | Fischer | 138/135 |
| 1,637,141 | 7/1927 | Cooper | 138/131 |
| 1,637,141 | 7/1927 | Cooper | 138/135 |
| 2,135,057 | 11/1938 | Slayter et al. | 138/DIG. 2 |
| 2,330,651 | 9/1943 | Welger | 138/133 |
| 2,604,509 | 7/1952 | Blanchard | 138/130 X |
| 2,653,887 | 8/1947 | Slayter | 138/DIG. 2 |
| 2,704,556 | 3/1955 | Blish | 138/DIG. 8 |
| 2,747,616 | 5/1956 | De Granahl | 138/132 X |
| 2,825,364 | 3/1958 | Cullen et al. | 138/132 X |
| 2,938,566 | 5/1960 | Toulmin | 138/DIG. 2 |
| 2,998,028 | 8/1961 | Rohde | 138/DIG. 8 X |
| 3,002,534 | 10/1961 | Noland | 138/DIG. 2 |
| 3,062,242 | 11/1962 | Vanderbilt | 138/DIG. 2 |
| 3,085,919 | 4/1963 | Clark | 138/174 |
| 3,318,337 | 5/1967 | Bauer | 138/130 |
| 3,436,289 | 4/1969 | Hardwick | 138/122 |
| 3,451,661 | 6/1969 | Barker | 138/155 X |
| 3,477,474 | 11/1969 | Mesler | 138/174 X |
| 3,604,461 | 9/1971 | Matthews | 138/130 X |
| 3,858,616 | 1/1975 | Thiery | 138/133 |
| 3,885,594 | 5/1975 | Tanaka | 138/129 |

FOREIGN PATENTS OR APPLICATIONS

| | | | |
|---|---|---|---|
| 1,186,089 | 4/1970 | United Kingdom | 138/133 |
| 754,491 | 8/1956 | United Kingdom | 138/174 |

*Primary Examiner*—Richard E. Aegerter
*Assistant Examiner*—James E. Bryant, III
*Attorney, Agent, or Firm*—Craig & Antonelli

[57] ABSTRACT

The invention relates to a flexible elongated member provided with a reinforcing armouring formed by profiled rods. The convolutions of said reinforcing armouring are wound in such a manner that the moment of inertia of the cross section of the profiled rods is maximum with respect to an axis perpendicular to a radial direction of the elongated member.

28 Claims, 12 Drawing Figures

4,013,100

FLEXIBLE ELONGATED MEMBER COMPRISING A REINFORCING ARMOURING

The present invention relates to a flexible elongated member provided with one or more reinforcing armourings.

More particularly, the invention concerns an elongated member, such as a cable, a pipe, etc ... comprising at least one traction-withstanding reinforcing armouring.

For a better understanding of the following description, reference will more particularly be made, by way of non limitative example only, to a flexible pipe comprising a traction-withstanding armouring and suitable for conveying a fluid (such as a hydrocarbon), or for constituting a drill pipe with a view to carry out the drilling technique known as "flexodrilling."

Such pipes are, as a matter of fact, subjected to high traction forces, either when they are placed in position (particularly when they are laid onto the sea bottom), or during their utilization.

These pipes usually comprise at least one first, crush-withstanding, armouring and a second, traction-withstanding, armouring, surrounding the first armouring.

Optionally one or two flexible sheaths provide for tightness of the flexible pipe.

In order to obtain a good flexibility of the pipe, the traction-withstanding armouring is formed of two layers of wires, strands or metal strips which are helically wound in opposite directions around the crush-withstanding armouring. The winding pitch, which is the same for the two layers of this armouring determines the flexibility of the pipe. When the value of this pitch is increased, the resistance of the pipe to tractive forces is also increased, but the flexibility of the pipe decreases.

Conversely, when decreasing the value of the pitch, the flexibility of the pipe increases to the prejudice of the resistance to tractive forces.

For each particular use, those skilled in the art will have to select the winding pitch and the cross-section of the wires, strands or rods which constitute the traction-withstanding armouring.

The so-constituted prior art armourings are capable of withstanding very high tractive forces. However, it has been ascertained that the use of flexible wires or strands for constituting the traction resisting armouring layers leads to a bad stability of these armourings.

As a matter of fact, in case of an accidental breaking or upon cutting a traction-withstanding armouring, the flexible wires or strands tend to spread away from the pipe axis. This bad stability is also apparent when the pipe is subjected to bending stresses, for example when the pipe passes over direction reversing means, such as a pulley.

It has been proposed to form the layers of each armouring of rigid rods which are subjected, during the manufacture of the armouring, to a permanent deformation which is a function of the armouring diameter and of the winding pitch.

Through this performing the first of the above-mentioned drawbacks is obviated and it becomes possible to cut out a pipe without the profiled rods spontaneously spreading away from the pipe axis, but the formed armouring is still instable when the pipe is subjected to bending stresses.

In an attempt to obviate this last drawback, there have been used preformed rods with a profiled S- or Z-shaped cross-section, permitting the interlocking of adjacent rods, the greatest size of this cross-section being placed along a direction substantially at right angles to the radius of the pipe which passes through the centre of gravity of the cross-section of the profiled rod. Even when combined with an increased preforming (or "superforming") of the rods, such an arrangement does not provide for a sufficient stability of the armouring and the profiled interlocking rods may unfasten without any liability for adjacent convolutions to come again to an interlocking position, when the pipe is subjected to bending stresses.

The purpose of the present invention is to provide a flexible elongated member, such as a pipe, equipped with a stable reinforcing armouring, capable of withstanding, without being distorted, high tractive forces and the flexion stresses which may be applied to the elongated member.

The invention will be properly understood and advantages thereof will be made apparent from the description of non-limitative embodiments thereof, illustrated by the accompanying drawings wherein:

FIG. 1 represents a type of tight flexible pipe, capable of withstanding high traction stresses, wherein the traction-withstanding armouring is made according to the prior art teaching.

Figures 1, 2:
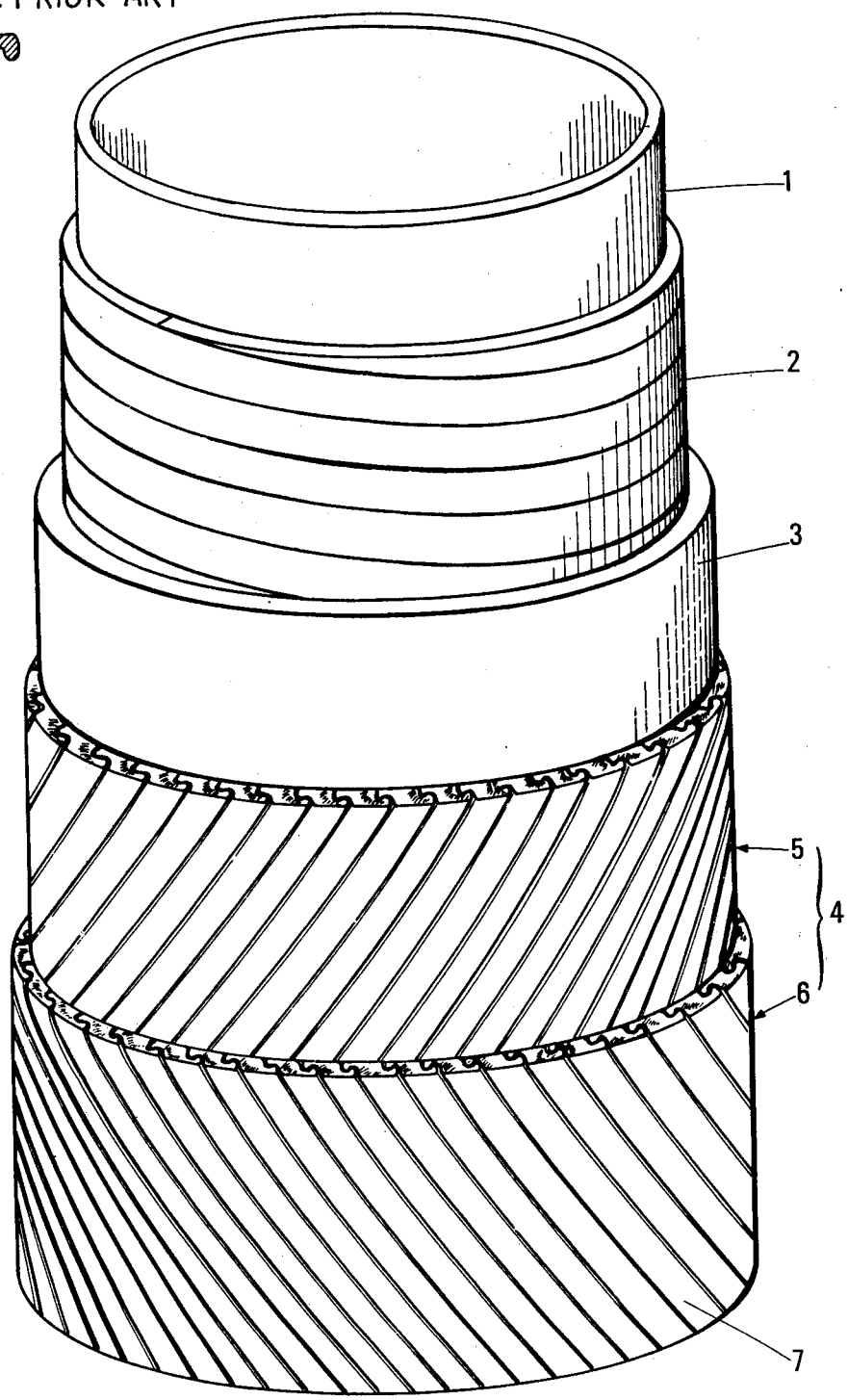
FIG. 1 illustrates a prior art flexible pipe provided with a traction-withstanding armouring.
FIG. 2 shows the cross-section of one of the profiled rods forming the traction-withstanding armouring illustrated by FIG. 1.

This pipe comprises, from the inside to the outside an inner flexible sheath or tubular core 1, for example of plastic material, such as an elastomer, a flexible metallic armouring 2 surrounding the tubular core 1 and capable of withstanding the stresses resulting from the pressures prevailing inside and outside the flexible pipe, a flexible, tight pipe 3, made of a plastic material, such as an elastomer, covering the armouring 2, so that the pressure prevailing outside the pipe is not directly exerted on the tubular core 1, and a traction resisting armouring.

The tubular core 1, the armouring 2 and the core 3 form no part of this invention and will not be described here in detail. As already known, the armouring 2 is, for example, formed by the helical winding, with a small pitch, of interlocking convolutions of a profiled element having a S- or Z-shaped cross-section.

The traction-withstanding armouring 4 is formed of two layers 5 and 6 helically wound in opposite directions with a high pitch. Usually, the convolutions of these windings are inclined on the pipe axis by an angle at most equal to 40°.

According to the prior art teaching, each layer is formed by a plurality of wires, or metal strands, or also, as shown in FIG. 1, by profiled metal rods 7 which are preformed and so positioned that the direction of the greatest length of their cross-section remains substantially perpendicular to a radius of the flexible pipe.

FIG. 2 shows the cross-section of each rod 7 which permits the interlocking of these rods with each other.

Figure 3:
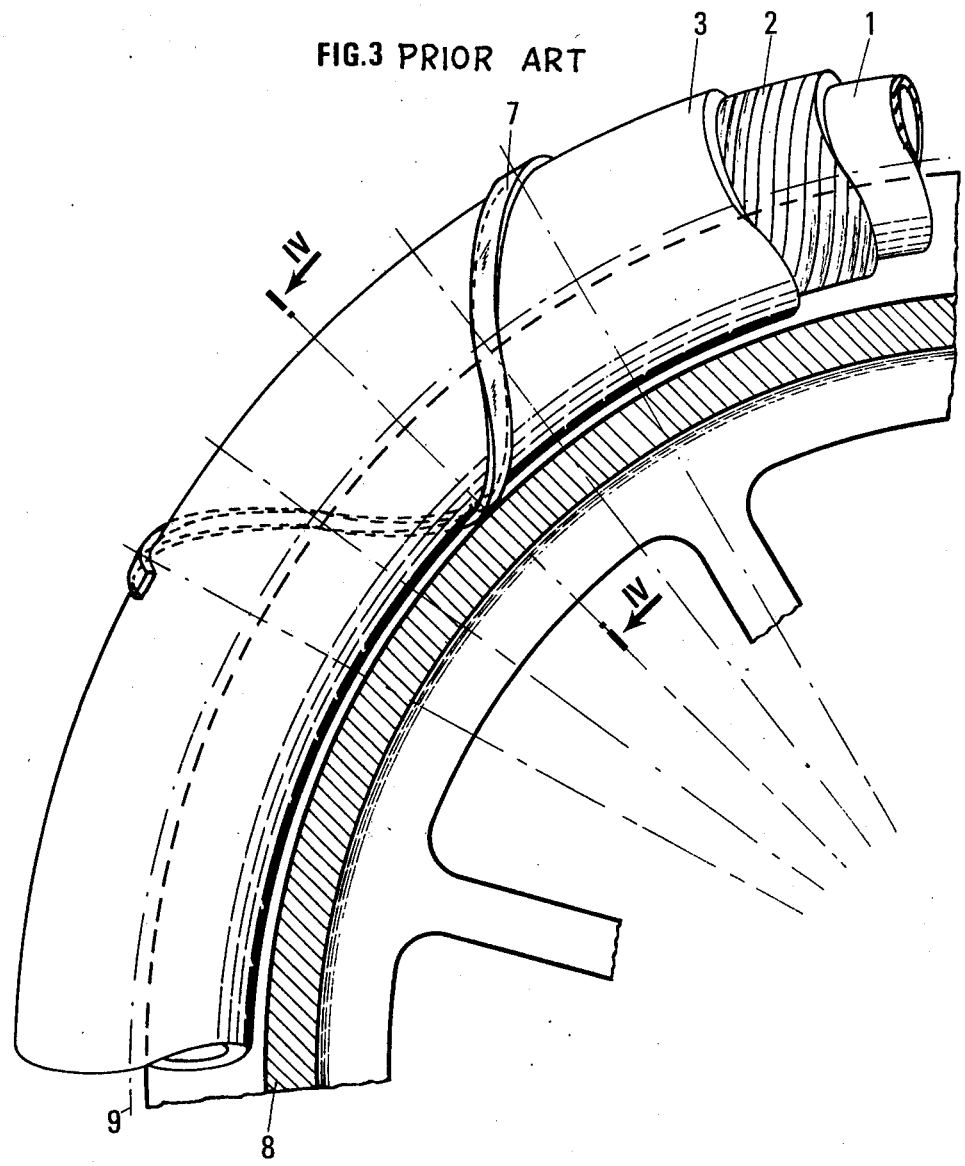
FIG. 3 is a perspective view showing the theoretical deformation of one of the profiled rods of the traction withstanding armouring of the pipe according to FIG. 1.

FIG. 3 diagrammatically shows the theoretical defomation of a profiled rod 7 of the traction-withstanding armouring, when the flexible pipe is subjected to bending stresses, particularly when passing over a pulley 8.

It appears that below the neutral line 9, shown in dashed lines, the generatrices of the flexible pipe are under compression, whereas the external generatrices are lengthened, only the lengths of the generatrices located at the level of the neutral line 9 being unchanged.

Consequently, as it can be seen in FIG. 3, a convolution formed of a profiled rod 7 which is located in the zone of bending has a winding pitch whose value, as compared to that of the winding pitch when the pipe is rectilinear, must be lower in the zone of compression and greater in the zone of elongation of the pipe.

It can be ascertained that this variation in the winding pitch increases when the radius of curvature of the pipe is reduced.

Figure 4:
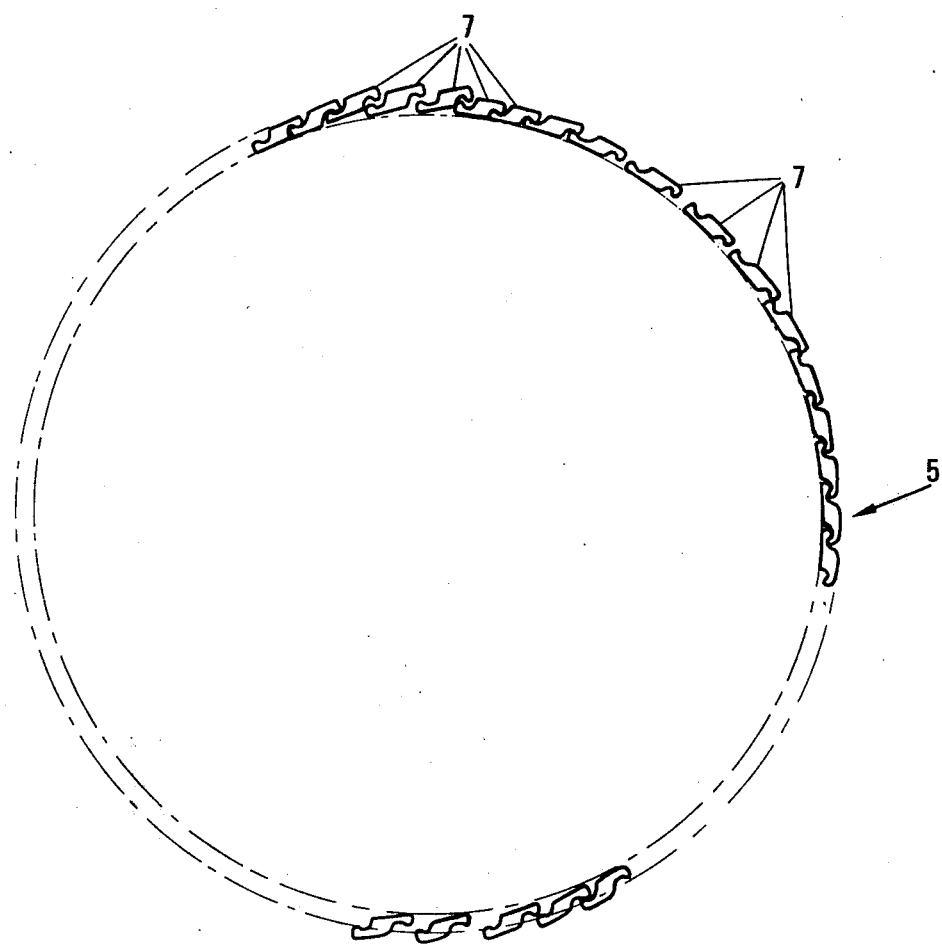
FIG. 4 is a diagrammatic cross-sectional view along line IV—IV of FIG. 3, showing all of the profiled rods of one layer of the traction-withstanding armouring.

With the profiled rods employed up to now, the difficulty of adaptation of these rods to the variations in the winding pitch results in a certain twisting of the profiled rods producing a local unfastening of these interlocking rods, without any possibility that these rods come again to an interlocked position in the zones of compression and those of elongation of the pipe subjected to bending stresses. This phenomenon is diagrammatically illustrated by FIG. 4 wherein only the armouring layer 5 has been shown.

The instability of the traction withstanding armouring is obviated in the flexible pipes according to the invention by constituting the traction withstanding armouring with helically wound preformed profiled rods, each of these rods having a cross-section which, with respect to a transverse axis X'X (FIGS. 5A to 5D) passing through the centre of gravity G of this cross-section, has a moment of inertia whose value is maximum as compared to the values of the moments of inertia with respect to the other axes passing through G. Each of these cross-sections is so positioned that the radius OG of the pipe passing through the centre of gravity G is substantially perpendicular to the axis X'X.

FIGS. 5A to 5D show, in a cross sectional plane perpendicular to the pipe axis, a portion of one layer of the traction withstanding armouring of the flexible pipe according to the invention.

In these drawings different possible shapes of the cross-section of the rods 7 are illustrated. These cross-sections may be rectangular (FIG. 5A), trapezoidal (FIG. 5B), T-shaped (FIG. 5C) or I-shaped (FIG. 5D).

During the manufacture of the armouring, a spacing "e" is preferably maintained between the different rods, in order to permit transmission of radial forces to the underlying armourings such radial forces being for example exerted by gripping shoes of a device for handling the pipe, such as an endless chain pulling device.

Figure 5A:
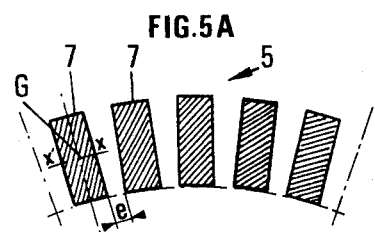
FIGS. 5A, 5B, 5C and 5D illustrate different possible shapes of the cross-section of the profiled rods in a traction-withstanding armouring equipping a flexible pipe according to the invention.
Figure 5B:
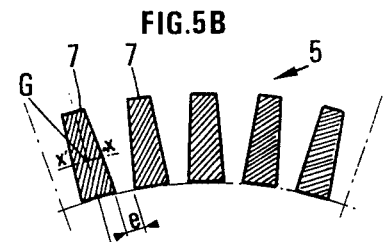
Figure 5C:
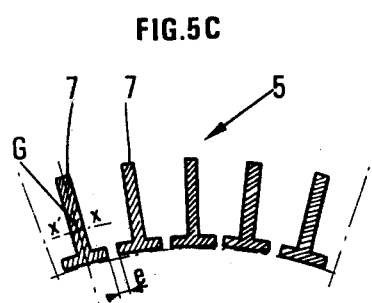
Figure 5D:
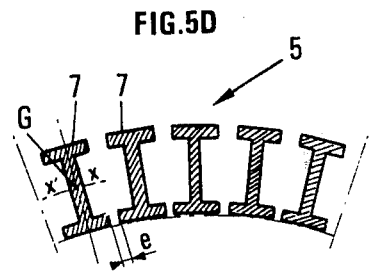
Figure 6A:
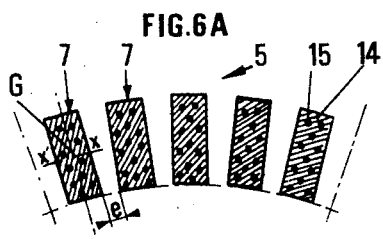
FIGS. 6A to 6D illustrate profiled rods made of non metallic materials, these rods having the same cross-section as those illustrated by FIGS. 5A to 5D.
Figure 6B:
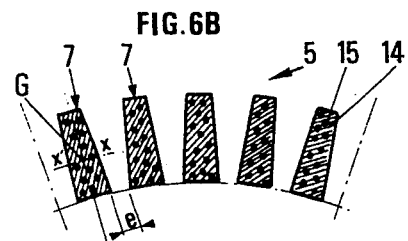
Figure 6C:
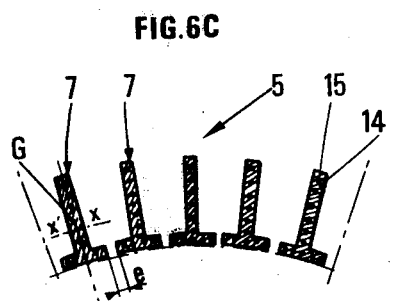
Figure 6D:
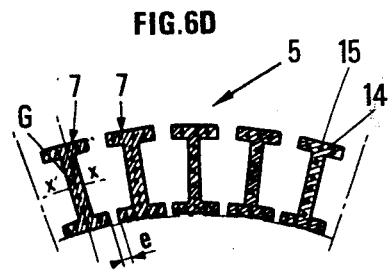

As shown by FIGS. 5A to 5C, the rods 7 are so positioned that the greatest length of their cross-section is oriented substantially along a radial direction of the pipe.

Optionally the free spaces between the rods of an armouring layer may be partially or fully filled with a deformable material giving a better cohesion to the rods of this layer.

The exact shape of the rod cross-section may be determined by those skilled in the art as a function of the internal and external diameters of the traction withstanding armouring to be constituted, the maximum tractive force applied to the pipe, the winding pitch of the rods, and the easiness of adaptation of the rods to variations in their winding pitch, required when the flexible pipe is subjected to bending stresses.

This easiness of adaptation increases when the value of the ratio $Mm/M_p$ becomes greater than 1, Mm being the maximum value of the moment of inertia of the cross section with respect to the above-defined axis X'X passing through the centre of gravity of this cross-section and $M_p$ being the moment of inertia of the cross-section with respect to the axis OG. In practice, the ratio $Mm/M_p$ will preferably comply with the relationship:

$$1.5 < \frac{Mm}{Mp} < 2 \text{ and particularly } 1.6 < \frac{Mm}{Mp} < 1.8$$

The profiled rods 7 forming each of the traction withstanding armouring layers may be made of a metallic material exhibiting good mechanical properties and preferably a good resistance to corrosion by the medium in contact with the rods.

However, when it is important to manufacture tight flexible pipes of low weight, the preformed rods 7 may be made of a resin matrix provided with reinforcements made of substantially parallel filaments or fibers 15 having a high elasticity modulus and which are not, or only slightly, twisted.

The matrix may be a thermosetting resin, such as a formophenolic resin, an unsaturated polyester or an epoxy resin, this list being by no way limitative, or a thermoplastic resin whose temperature of vitrous transition is at least 30° C greater than the temperature of use of the pipe, for example phenylpolyoxide or polysulfone resin, this list being also not limitative.

The reinforcement may be constituted by fibers having a high elasticity modulus, in the form of continuous filaments and/or fabrics and/or felts, or cushion of cut fibers.

The filaments constituting the reinforcements may be glass fibers, organic fibers having a modulus of elasticity of at least 700,000 bars, particularly carbon fibers or also metal wires.

The proportion of filaments will be preferably high (greater than 30% by volume), in order to obtain the highest possible elasticity modulus and resistance.

The filaments are subjected to a surface treatment by a product providing a proper adherence of the matrix on the filaments in order to obtain a maximum reinforcing effect.

The so-constituted material is used in the form of profiled rods of great lengths and substantially constant section.

The profiled rods are obtained by continuous drawing through a hot die of suitable cross section or according to any other similar process providing profiled rods of substantially constant cross section and great lenth units.

What we claim is:

1. A flexible elongated member, having an axis of elongation and a substantially circular cross-section, including a reinforcing armouring capable of withstanding tractive and bending stresses applied to said elongated member, said armouring comprising at least one layer of elongated profiled metal rods, said metal rods being preformed to constitute helical windings having adjacent convolutions inclined with respect to said axis of elongation by an angle at most equal to 40°, each of said profiled rods having a configuration with a cross-section, said cross-section of said rod having a static centre of gravity and a moment of inertia with respect to a transverse axis of said cross-section of said profiled rods through said centre of gravity, said moment of inertia relative to said transverse axis of said cross-section being a maximum relative to all other axes passing through said centre of gravity, and each of said profiled rods being positioned on said flexible elongated member with said circular cross-section of said elongated member having a radial direction passing through said centre of gravity of said cross-section of said rod perpendicular to said transverse axis, said adjacent convolutions being freely movable with respect to one another.

2. A flexible elongated member, having an axis of elongation and a substantially circular cross-section, including a reinforcing armouring capable of withstanding tractive and bending stresses applied to said elongated member, said armouring comprising at least one layer of elongated profiled metal rods, said metal rods being preformed to constitute helical windings having adjacent convolutions inclined with respect to said axis of elongation by an angle at most equal to 40°, each of said profiled rods having a configuration with a cross-section, said cross-section of said rod having a static centre of gravity and a moment of inertia with respect to a transverse axis of said cross-section through said centre of gravity, said moment of inertia relative to said transverse axis of said cross-section being a maximum relative to all other axes passing through said centre of gravity, and each of said profiled rods being positioned on said flexible elongated member with said circular cross-section of said elongated member having a radial direction passing through said centre of gravity of said cross-section of said rod perpendicular to said transverse axis, wherein the ratio between the moment of inertia with respect to said transverse axis, and the moment of inertia with respect to said radial direction is from 1.5 to 2.

3. A flexible elongated member according to claim 1, wherein the ratio between the moment of inertia of the cross-section of each rod, with respect to said transverse axis, and the moment of inertia of said cross-section, with respect to said radial direction passing through the centre of gravity of said cross-section and perpendicular to said transverse axis, is from 1.6 to 1.8.

4. A flexible elongated member according to claim 2, wherein the cross-section of each profiled rod has a substantially rectangular shape.

5. A flexible elongated member according to claim 2, wherein the cross-section of each profiled rod has a substantially trapezoidal shape.

6. A flexible elongated member according to claim 2, wherein the cross-section of each profiled rod is substantially T-shaped.

7. A flexible elongated member according to claim 2, wherein the cross-section of each profiled rod is substantially I-shaped.

8. A flexible elongated member according to claim 1, wherein the profiled rods of each armouring layer are so positioned on said flexible elongated member to leave a free space between adjacent rods.

9. A flexible elongated member having an axis of elongation and a substantially circular cross-section, including a reinforcing armouring capable of withstanding tractive and bending stresses applied to said elongated member said armouring comprising at least one layer of elongated profiled rods, said rods being preformed to constitute helical windings having adjacent convolutions inclined with respect to said axis of elongation by an angle at most equal to 40°, each of said profiled rods having a configuration with a cross-section, said cross-section of said rod having a static centre of gravity and a moment of inertia with respect to a transverse axis of said cross-section through said centre of gravity, said moment of inertia relative to said transverse axis of said cross-section being a maximum relative to all other axes passing through said centre of gravity, and each of said profiled rods being positioned on said flexible elongated member with said circular cross-section of said elongated member having a radial direction passing through said centre of gravity of said cross-section of said rod perpendicular to said transverse axis, wherein the ratio between the moment of inertia with respect to said transverse axis, and the moment of inertia with respect to said radial direction is from 1.5 to 2, wherein the profiled rods are made of a matrix of resin provided with a reinforcement constituted by substantially parallel filaments having a high elasticity modulus and which are not substantially twisted.

10. A flexible elongated member according to claim 9, wherein the ratio of filaments in said matrix is at least equal to 30 % per volume.

11. A flexible elongated member according to claim 10, wherein the resin constituting said matrix is a thermosetting resin.

12. A flexible elongated member according to claim 9, wherein the resin constituting said matrix is a thermoplastic resin.

13. A flexible elongated member according to claim 9, wherein the filaments reinforcing the resin are continuous filaments.

14. A flexible elongated member according to claim 9, wherein the filaments reinforcing the resin are glass fibers.

15. A flexible elongated member according to claim 14, wherein the glass fibers are so pretreated as to adhere to the resin.

16. A flexible elongated member according to claim 9, wherein a fiber with a high elasticity modulus which reinforces the resin is a continuous organic fiber having an elasticity modulus of at least 700,000 bars.

17. A flexible elongated member according to claim 16, wherein the organic fiber is so pretreated as to adhere to the resin.

18. A flexible elongated member according to claim 16, wherein said organic fiber is a carbon fiber.

19. A flexible elongated member according to claim 9, wherein the filaments reinforcing the resin are metal wires.

20. A flexible member having an axis of elongation and having a substantially circular configuration with a cross-section in a plane perpendicular to said axis of elongation, including a reinforcing armouring withstanding tractive and bending stresses, said armouring comprising two superimposed armouring layers of helically wound elongated and profiled rods preformed to constitute successive convolutions disposed on said flexible member, said convolutions being inclined with respect to said axis of elongation by an angle at most equal to 40°, said two layers having convolutions of opposite inclinations with respect to said axis of elongation, each profiled rod having in said plane perpendicular to said axis of elongation a cross-sectional configuraton with a predetermined elongated cross-sectional direction, greater than all other cross-sectional directions, and each of said profiled rods being disposed on the flexible member with said elongated direction of said rod configuration being substantially along a radial direction of said substantially circular configuration of the flexible member perpendicular to said axis of elongation, said successive convolutions of each of said two layers being freely movable with respect to one another such that the pitch of said successive convolutions is adaptable to the bending stresses applied to the flexible member.

21. In an elongated flexible pipe having an axis of elongation, said pipe including a tubular core, a flexible armouring disposed on said core for withstanding pressure stresses on said pipe, a flexible covering disposed on said flexible armouring, and a traction resisting armourng disposed on said flexible covering, said traction resisting armouring comprising:
at least one layer of a plurality of helically wound profiled preformed elongated rods, each of said rods being preformed to constitute a helical winding forming successive convolutions with said convolutions being inclined with respect to said axis of elongation by an angle at most equal to 40°, and each of said profiled rods having a cross-sectional configuration with one cross-sectional dimension being substantially greater than all other cross-sectional dimensions,
wherein each of said profiled rods are disposed in said at least one layer with said one greater cross-sectional dimension being perpendicular to said axis of elongation,
and wherein each of said successive convolutions of adjacent rods are freely movable with respect to one another.

22. An elongated flexible pipe according to claim 21, wherein said traction resisting armouring comprises two layers of said plurality of helically wound profiled rods, and wherein the successive convolutions of one layer are oppositely inclined to the successive convolutions of the other layer of said two layers with respect to said axis of elongation.

23. An elongated flexible pipe according to claim 21, wherein said cross-sectional configuration of each of said profiled rods is rectangular.

24. An elongated flexible pipe according to claim 21, wherein said cross-sectional configuration of each of said profiled rods is trapezoidal.

25. An elongated flexible pipe according to claim 21, wherein said cross-sectional configuration of each of said profiled rods is T-shaped.

26. An elongated flexible pipe according to claim 21, wherein said cross-sectional configuration of each of said profiled rods is I-shaped.

27. An elongated flexible pipe according to claim 21, wherein said plurality of helically wound rods include a spacing between respective adjacent convolutions.

28. An elongated flexible pipe according to claim 27, wherein a deformable material at least partially fills said spacing between respective adjacent convolutions.

* * * * *

UNITED STATES PATENT AND TRADEMARK OFFICE
CERTIFICATE OF CORRECTION

PATENT NO. : 4,013,100
DATED : March 22, 1977
INVENTOR(S) : Jean Thiery, et al.

It is certified that error appears in the above-identified patent and that said Letters Patent are hereby corrected as shown below:

Title Page, (73) Assignee, which now reads:

"(73) Assignee: Institut Francais du Petrole, des Carburants et Lubrifiants et Entreprise de Recherches et d'Activities Petrolierers Elf, France"

should read:

--(73) Assignee: Institut Francais du Petrole, Des Carburants et Lubrifiants, France--

Signed and Sealed this

Nineteenth Day of June 1979

[SEAL]

Attest:

RUTH C. MASON
Attesting Officer

DONALD W. BANNER
Commissioner of Patents and Trademarks